United States Patent [19]

Lehner et al.

[11] 4,357,221
[45] Nov. 2, 1982

[54] PROCESS FOR COATING ELECTRICALLY CONDUCTIVE OBJECTS WITH POLYURETHANE

[75] Inventors: August Lehner, Roedersheim-Gronau; Juergen Gimpel, Ludwigshafen; Ingolf Buethe, Mannheim; Heinrich Hartmann, Limburgerhof; Hans-Uwe Schenck, Wachenheim, all of Fed. Rep. of Germany

[73] Assignee: BASF Aktiengesellschaft, Ludwigshafen, Fed. Rep. of Germany

[21] Appl. No.: 231,719

[22] Filed: Feb. 5, 1981

[30] Foreign Application Priority Data

Dec. 9, 1980 [DE] Fed. Rep. of Germany ....... 3005034

[51] Int. Cl.$^3$ ..................... C24D 13/06; C08G 69/46
[52] U.S. Cl. ............................ 204/181 R; 204/181 E; 204/159.19
[58] Field of Search ........................ 204/181 R, 181 E

[56] References Cited

U.S. PATENT DOCUMENTS 3,928,667 12/1975 Carlos et al. .................... 204/181 R
4,066,591 1/1978 Scriven et al. .................. 204/181 R

*Primary Examiner*—Howard S. Williams
*Attorney, Agent, or Firm*—David L. Hedden; Joseph D. Michaels

[57] ABSTRACT

A process for coating electrically conductive objects comprising

A. immersing said object as the anode of an electric current in an aqueous polyurethane dispersion prepared by
  (1) forming a polyurethane solution by reacting an organic polyisocyanate in the presence of an organic solvent with
    (a) an acrylic ester diol having a molecular weight of between 146 and 3,000;
    (b) an organic polyhydroxyl compound other than (a) having a molecular weight between 400 and 5,000 selected from the group consisting of polyester, polyols, polyether polyols, polycarbonates, polylactones, and mixtures thereof; and
    (c) a chain extender selected from the group consisting of diols, triols, diamines, aminoalcohols, having a molecular weight between 62 and 400, water, and mixtures thereof;
  (2) forming an anionic polyurethane addition product by reacting said polyurethane solution with a mercaptocarboxylic acid salt in the presence of a solvent;
  (3) adding water; and
  (4) removing the organic solvent, and
B. passing an electric current between the anode and a cathode which is also dispersed in said dispersion, and
C. irradiating said object with ultraviolet radiation or electron rays.

The process can be used for coating metals such as iron, steel and aluminum.

11 Claims, No Drawings

PROCESS FOR COATING ELECTRICALLY CONDUCTIVE OBJECTS WITH POLYURETHANE

BACKGROUND OF THE INVENTION

1. Field of the Invention

This invention relates to a process for coating electrically conductive objects with an anionic polyurethane coating by immersing the object as the anode into an aqueous polyurethane dispersion and passing an electric current between the anode and a cathode which also is immersed in the dispersion.

2. Description of the Prior Art

Electro-immersion coating is an environmentally sound process where the coating is deposited on electrically conductive objects. Following this process, the coatings are cross-linked, generally at increased temperatures.

Radiation curing of coatings applied by spraying, immersion, and brushing is also known in the art. This process requires binders which involve the use of prepolymers containing olefinic groups together with poly- and monofunctional monomers. Environmental protection problems are encountered in processing these mixtures due to the vapor pressure of the monomers used.

However, by combining both processes, it is possible to eliminate the environmental protection problems of the conventional radiation cured coating as well as to produce an electro-immersion coating which need not be thermally cross-linked. This process may be applied in those instances where metal surfaces must be uniformly coated. Conventional application of radiation cured coatings to metals does not result in the uniformity of the layer thickness which is possible with electro-immersion coating. The adhesion to the metallic substrate of the coatings, for instance by spraying, immersion, and brushing, is poor. Electrophoretically deposited paint films adhere considerably better.

German Published Application No. 2,207,031 describes a coating which consists of an electro-immersion primer and a paint coat which can be cured by irradiation and which is applied to the primer. Such a coating is also described in German Application No. 2,015,287 and Japanese Pat. No. 73/04,446. In order to improve the adhesion between the two layers, the multi-layer paint coats must be baked for some time at increased temperatures.

Coatings containing the polar groups required for the electro-immersion deposition, as well as the double bonds required for the radiation curing, are described in German Application No. 2,301,075. The binders used consist of unsaturated acid resins and water-insoluble polyfunctional ultraviolet cross-linking agents. In this context, acid resins are understood to be reaction products of an epoxide resin and unsaturated fatty acids which are maleinized fatty acid-modified unsaturated acid alkyd resins, and maleinized oils which are modified with styrene or methylacrylate. Resins containing ethylenically unsaturated double bonds and carboxyl groups, which can be used in electrophoretic deposition, are also described in U.S. Pat. No. 4,040,925.

SUMMARY OF THE INVENTION

A process has been discovered for coating electrically conductive objects comprising A. immersing said object as the anode of an electric current in an aqueous polyurethane dispersion prepared by
  (1) forming a polyurethane solution by reacting an organic polyisocyanate in the presence of an organic solvent with
    (a) an acrylic ester diol having a molecular weight of between 146 and 3,000;
    (b) an organic polyhydroxyl compound other than (a) having a molecular weight between 400 and 5,000 selected from the group consisting of polyester polyols, polyether polyols, polycarbonates, polylactones, and mixtures thereof; and
    (c) optionally a chain extender selected from the group consisting of diols, triols, diamines, aminoalcohols, having a molecular weight between 62 and 400, water, and mixtures thereof;
  (2) forming an anionic polyurethane addition product by reacting said polyurethane solution with a mercaptocarboxylic acid salt in the presence of a solvent;
  (3) adding water; and
  (4) removing the organic solvent,
B. passing an electric current between the anode and a cathode which is also immersed in said dispersion, and
C. irradiating said object with ultraviolet radiation or electron rays.

The process can be used for coating metals such as iron, steel, and aluminum. Coatings with improved properties such as adhesion, corrosion protection, application, and elasticity can be prepared by this process.

DESCRIPTION OF THE PREFERRED EMBODIMENT

The polyurethane solutions used in accordance with this invention to prepare the aqueous polyurethane dispersion is prepared by reacting an organic polyisocyanate in the presence of an organic solvent with a mixture of an acrylic ester diol having a molecular weight between 146 and 3,000; a polyhydroxyl compound having a molecular weight between 400 and 5,000; and optionally a chain extender selected from the group consisting of diols, triols, diamine, aminoalcohols, having a molecular weight between 62 and 400, water and mixtures thereof. These ingredients will now be described in detail.

Suitable polyisocyanates which may be employed in accordance with this invention to form the polyurethane solution include the commonly-used compounds known from polyurethane chemistry, particularly the diisocyanates. Aromatic as well as aliphatic or heterocyclic diisocyanates may be used, for instance, 4,4-diphenylmethane diisocyanate, dicyclohexylmethane diisocyanate, 1,5-naphthalene diisocyanate, 2,4- and 2,6-toluene diisocyanate, hexamethylene diisocyanate, isophorone diisocyanate, trimethylhexamethylene diisocyanate, and dicyclohexylmethane diisocyanate. In some special cases, partially capped polyisocyanates may also be used which make possible the formation of polyurethanes which are more cross-linked. These include dimeric toluene diisocyanate, or polyisocyanates partially reacted with, for instance, phenol, tertiary butanol, phthalamide or caprolactam.

Suitable acrylic ester diols which may be employed in this invention to form the polyurethane solution have molecular weights between 146 and 3000 and are reaction products of epoxide compounds with polymerizable olefinically unsaturated carboxylic acids, particularly acrylic and methacrylic acid, with one carboxyl group per epoxide group. Also suitable are reaction products of dicarboxylic acids with polymerizable olefinically unsaturated glycidyl compounds. These compounds are described in German Published Application No. 2,164,386 which is hereby incorporated into this application by reference. Reaction products of hydroxyl-group carrying monoepoxides such as glycidol with methacrylic acid may also be used as unsaturated acrylic ester diols.

Suitable epoxides which can be used in preparing the acrylic ester diols include epoxides with two terminal epoxide groups having the general formula

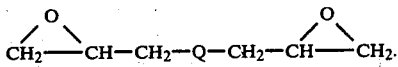

In this formula, Q represents a two bond radical such as

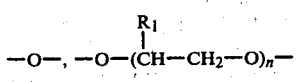

with $n=1-10$, wherein $R_1$ is hydrogen or methyl; $-O-(CH_2)_m-O-$
with $m=1-10$; or Q stands for a radical of the general formula

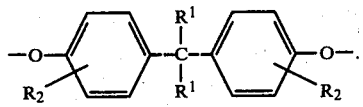

This radical can be derived from 4,4-dihydroxydiphenylmethane, Bisphenol A, or core-substituted derivatives of these compounds, such as alkyl, halo, amino, and nitro substituted derivatives.

During the later reaction with diisocyanates, the reaction products of the epoxide compounds with acrylic and/or methacrylic acid should be largely bifunctional relative to the hydroxyl groups. With a hydroxyl functionality of >3, there is a danger of cross-linking.

The reaction between the epoxide compounds and the polymerizable olefinically unsaturated acid monomers is a ring opening esterification between the diepoxide compounds, and the carboxyl groups of the polymerizable methacrylic acid which may be carried out in the familiar manner similar to the mode of operation set forth in German Published Application No. 2,164,386.

The above-referenced epoxide compounds and their reaction products may be used alone or as mixtures. Reaction products of Bisphenol A-diglycidyl ether (for instance, Epikote® 828 by Shell) or glycidol with acrylic or methacrylic acid are preferably suited as the acrylic ester diol.

Suitable organic polyhydroxyl compounds which can be used in conjunction with the acrylic ester diols to prepare the polyurethane solutions have molecular weights between 400 and 5000, preferably between 500 and 4000, and are selected from the group consisting of linear polyesters, polyeythers, polycarbonates, polylactones (for instance polycaprolactone), and mixtures thereof. In addition to terminal hydroxyl groups, such compounds may also contain carboxyl, amino or mercapto groups. The polyethers include the polymerization products of ethylene oxide, propylene oxide, tetrahydrofuran, butylene oxide, as well as their mixed or graft polymerization products, as well as the condensates obtained by condensation of multifunctional alcohols or mixtures of these alcohols, or the products obtained by alkoxylation of multifunctional alcohols.

The polyesters include esterification products of adipic acid with $C_2-C_{10}$ alkane diols or oxyalkane diols. The polycarbonates include, for instance, hexane diol carbonates. Preferably, a chain extender is also used to form the polyurethane solution.

Suitable diols, diamines, aminoalcohols or triols which can be used as chain extenders to prepare the polyurethane solutions have molecular weights between 62 and 400. Examples include the commonly-used saturated or unsaturated glycols such as ethylene glycol or condensates of ethylene glycol, butanediol, propylene glycol, trimethylene glycol, neopentyl glycol, diethoxyhydroquinone, butene diol, diethoxyldiane; mono- or bisalkoxylated aliphatic, cycloaliphatic, aromatic or heterocyclic primary and secondary amines such as ethanolamine, N-methylethanolamine, N-butylethanolamine, N-oleylethanolamine, N-cyclohexylisopropanolamine, polyethoxylated N-butylethanolamine; and aliphatic, cycloaliphatic or aromatic diamines such as ethylene diamine, hexamethylene diamine, 1,4-cyclohexylene diamine, benzidine, dimainodiphenylmethane, the isomers of phenylenediamine or hydrazine; and amino alcohols such as ethanolamine, propanolamine, or butanolamine. Multifunctional alcohols such as trimethylol propane, glycerine, etc., should be used in less than 15 equivalency percent. In some cases, water may be used as chain extender or may be used as one of various chain extenders.

The acrylic ester diols, organic polyhydroxyl compounds and chain extenders are generally used in quantities of 100:(10 to 400):(0 to 30), and preferably 100:(20 to 300):(1 to 20) respectively. For instance, 0 to 5 moles of bifunctional, 0 to 3 moles of higher functional chain extenders, and 1 to 30, preferably 5 to 25 moles of acrylate diols may be used per one mole of polyol. These ingredients are reacted with the organic polyisocyanate to form the polyurethane solution in quantities such that the ratio of isocyanate groups to reactive hydrogen atoms is from 0.4:1 to 1.3:1, preferably from 0.5:1 to 1.2:1, and particularly from 0.6:1 to 0.85:1. An excess amount of isocyanate may also be used for the manufacture of the polyurethanes. In this case, the ratio of isocyanate groups to reactive hydrogens may be between 1.15:1 and 1.3:1 and the isocyanate excess is reacted with water, alcohol, monoamine or hydroxy acrylates. The polyurethanes to be used in accordance with this invention generally have K values [according to Fikentscher, Cellulose Chemistry, Vol. 13, p. 58 (1932)] between 10 and 30, preferably between 15 and 25.

As was mentioned, the reaction forming the polyurethane solution is carried out in the presence of an organic solvent. In selecting the solvent, care must be taken that no solvent is used in the manufacture of the polyurethane mass which have functional groups reacting with the isocyanate groups under the reaction conditions. Any solvent may be used for the process according to this invention which does not react with the polyurethane mass and the reaction components. Preferably used solvents are halogenated and non-halogenated hydrocarbons, ketones, alcohols, ethers, esters or nitriles. Representative examples include acetone, methylethyl ketone, isopropanol, tertiary butanol, acetyl nitrile, ethyl acetate, methylene chloride, chloroform, carbon tetrachloride, dimethylformamide, dimethylsulfoxide, tetrahydrofuran or dioxane. Naturally, mixtures of such solvents may also be used.

The polyurethane solutions may be produced by familiar methods. For example, they may be produced on conveyor belts. In this case, the liquid raw materials are placed onto a long belt where they are mixed and transported by means of a geared pump. The belt has a heated and a cold zone. After the incompletely reacted polyurethane has left the belt, it is stored at increased temperatures until the polyaddition reaction has completed and is then dissolved.

The polyurethane solution may also be prepared by a single stage reaction. In this case, all substances participating in the reaction in concentrations of 20 to 90 percent, predominantly 30 to 70 percent, are weighed into the reaction vessel in solvent and are heated to 20° C. to 130° C., predominantly to 30° C. to 90° C. The polymerization is completed when the desired isocyanate value has been reached (with an excess of isocyanate) or when all isocyanate groups have been reacted (with an excess of hydrogen-active compounds).

The polyurethane solutions may also be prepared by a two stage reaction. In this case, the preliminary reaction of polyol and diisocyanate is carried out in part of the solvent, predominantly at 30° C. to 90° C. Following this, the chain is extended with a diol and triol. The further mode of operation corresponds with a single stage reaction.

The preparation of the polyurethane solution can be accelerated with polyurethane catalysts as they are known from the polyurethane chemistry. Commonly used catalysts include, for instance, metal organic compounds such as butyltin dilaurate, tertiary amines or triazines.

The polyurethane solution may contain 0.1 to 10, preferably 0.3 to 5 percent by weight of free isocyanate groups. However, in another preferred version, the polyurethane does not contain any unreacted isocyanate groups.

The polyurethane solution is mixed with a mercaptocarboxylic acid salt to form an anionic polyurethane addition product. These salts are added to the acrylate double bonds of the acrylic ester via mercaptoether bridges.

Suitable mercaptocarboxylic acids which can be used to prepare mercaptocarboxylic acid salts are carboxylic acids having one mercapto group. Particularly well suited are mercaptocarboxylic acids, where the mercapto group is in an $\alpha$- or $\beta$-position to the acid groups. The mercaptocarboxylic acids may be aliphatic, cycloaliphatic, araliphatic, or aromatic. They may, for instance, be mercaptoacetic acid, mercaptopropionic acid, mercaptobutyric acid, mercaptolineolic acid, mercaptotrimethylacetic acid, mercaptocyclohexanoic acid, mercaptophenylacidic acid, mercaptobenzoic acid, mercaptotoluenic acid, mercaptochlorobenzoic acid. Other suitable mercaptocarboxylic acids are reaction products of mercaptoethanol with poly- or dicarboxylic acid anhydrides, for instance, with succinic acid anhydride, maleic acid anhydride, phthalic acid anhydride, or trimellitic acid anhydride, when this results in the mercapto group remaining free. Particularly preferred is mercaptoacetic acid.

Many compounds can be used to transform the mercaptocarboxylic acids into their salt form. Organic bases may be used for this purpose. Representative examples include monofunctional primary, secondary and tertiary amines such as methylamine, diethylamine, trimethylamine, triethylamine, ethylamine, tributylamine, pyridine, methylethylamine, diethylmethylamine, aniline, toluidine; alkoxylated amines such as ethanolamine, diethanolamine, triethanolamine, methylenediethanolamine, oleodiethanolamine; as well as polyfunctional amines where the individual amino groups may have different basisity such as N,N-dimethylethylene diamine, aminopyridines, N,N-dimethylhydrazine. Preferably used are amines having a boiling point below 120° C. and among those the tertiary amines such as trimethylamine or triethylamine are preferred. Inorganic bases which are basically reacting or compounds which dissociate into base compounds may also be used to transform the mercaptocarboxylic acids into their salt form. Representative examples include ammonium, alkali or alkaline earth metal hydroxides, carbonates, and oxides. Preferred compounds are ammonium, potassium, and sodium hydroxide.

The polyurethane solution is reacted with such quantities of mercaptocarboxylic acid salts that the content of carboxylate groups of the addition product amounts to 3 to 15, preferably 4 to 8 percent by weight. The anionic polyurethane addition products to be used in accordance with this invention contain 0.3 to 3, preferably 0.5 to 2, moles of acrylic ester double bonds per 1000 grams of polyurethane resin. The reactivity of the mercapto group in the salt of the mercaptoacid is considerably higher compared with the acrylic double bond than compared with the isocyanate groups.

For the addition of the mercapto groups, the mercaptocarboxylic acid salts may be used in solid form or in solution. The use of solution is preferred. The solvents should not prevent the addition of the mercapto group. In special cases, however, it may be advantageous if at least part of the solvent can react with the isocyanate groups possibly still present in the polyurethane by extending or terminating the chains. Examples of solvents include halogenated hydrocarbons, ketones, alcohols, esters, water, ether, and diol-mono(meth-)acrylate. Advantageously, the reactive solvents are in most cases used in subordinate quantities only. Suitable reactive solvents are the chain extenders described for the polyurethane manufacture. Particularly well suited as nonreactive solvents are acetone, methylethylketone, tetrahydrofuran, diethylether, tertiary butanol, and toluene.

Advantages of the incorporation of the ionic group according to the process of this invention by adding mercapto-acid salts to double bonds of acrylates are that the reaction can be carried out at low temperatures (0° C. to 120° C., primarily 0° C. to 60° C.) and that the reaction takes place very quickly. At 35° C., the addition is completed, for instance, in less than 10 minutes. The feed time may be varied within wide limits. However, since the reaction is completed very quickly, feed times of less than 10 minutes, even 1 minute, are possible.

Following this, the water is added and the organic solvent is removed by distillation resulting in a uniform dispersion. However, in order to improve the properties (for instance increasing the thermal stability and hardness), multifunctional polyisocyanates may be added prior to adding the water. Suitable multifunctional polyisocyanates are described, for instance, in German Patent Nos. 1,090,196, 1,101,394, 1,222,067.

It has been found that the properties of the coatings can be optimized within wide limits, depending upon the specific needs, when the polyurethane dispersions are combined with mono-, di- or polyfunctional unsaturated cross-linking agents. It has further proven to be advantageous if the reactive cross-linking agent is added to the polyurethane ionomers which are dissolved, for instance, in acetone; and if the water is then introduced and the solvent is subsequently removed by distillation.

Suitable cross-linking agents are diolefinically unsaturated organic compounds having molecular weights between 130 and 2000 are, for instance, divinylbenzene, ethylene glycol diacrylate, methacrylated polyesters, methacrylated urethane and polyurethanes, methacrylated polyethers and reaction products of epoxides with methacrylic acid. Particularly preferred are reaction products of glycidyl ethers and phenols (of the bisphenol A-type having a molecular weight of approximately 370) with (meth)acrylic acid in a mole ratio of 1:2. These "cross-linking agents" may be used in quantities of up to 50 percent by weight of anionic polyurethane addition product.

Electrically conductive objects, as the anode, are coated by immersing them in a bath containing aqueous polyurethane dispersion with or without cross-linking agents. An electric current is passed between the anode and the cathode which is also dispersed in the aqueous polyurethane dispersion with or without the cross-linking agent.

The electro-immersion bath preferably contains 5 to 20 percent by weight of a binder consisting of 50 to 100 percent by weight of the anionic polyurethane and 0 to 50 percent by weight of a water-insoluble polyfunctional cross-linking agent. Aqueous dispersions, which are adjusted to a solids content of 5 to 20, preferably 8 to 15 percent by weight by adding fully demineralized water, are used as electroimmersion baths. The pH value of the electroimmersion bath is generally between 7.2 and 9.0, preferably 7.2 to 8.2, and the deposition voltage between 50 and 300 volts, the bath temperature being located between approximately 18° and 30° C. The deposition time is 15 seconds to 3 minutes. See W. Machu, *Electroimmersion Painting*, page 163 et seq.

Preferably, the deposited coating is subsequently rinsed with fully demineralized water, blown dry by compressed air, and dried at temperatures of, for instance, 50° C. to 120° C. The deposited coating is then cured by irradiating the electrically conductive object with ultraviolet radiation or electron rays. The use of one or more of the commonly used photo-initiators is required for the ultraviolet curing. Preferred are benzophenone and derivates, benzoin, benzoinether, benzil, benzilketals, thioxanthones and so forth; particularly preferred are benzildimethylketal and methylthioxanthone.

If less than 0.5 percent by weight of ultraviolet initiator is used, the deposited film is not sufficiently hardened by the UV radiation. The mechanical properties of the deposited paint film deteriorate greatly when more than 10 percent by weight is used due to the plasticizer effect of the UV initiator. When using 1 to 5 percent, the best mechcanical properties of the paints are achieved. Suitable radiation sources for the ultraviolet hardening include low pressure mercury lamps, high pressure mercury lamps, etc., described for instance in "UV-Curing, Science and Technology" by S. Peter Papas, Technology Marketing Corporation, Stamford, USA (1978).

UV initiators are not required for the curing by means of electron radiation. Suitable electron radiation sources include the Van de Graaff accelerator and linear accelerator (described for instance in Published German Application No. 2,049,715). Generally, accelerated electrons with 150 to 350 KeV and a dosage of 10 to 100 Joule per gram are utilized. The curing by means of electron radiation generally takes place under a protective gas such as nitrogen.

In addition to the binder, the coating agents to be used in accordance with this invention may contain the commonly used pigments such as titanium dioxide, talcum, carbon black, or mixtures thereof in quantities up to 60 parts, preferably up to 30 parts, as well as up to 45 parts of organic substances without carbon to carbon double bonds. In each case the number of parts is relative to 100 parts by weight of the binder. In addition to this, up to 10 parts of flow improvers and up to 10 parts of waxes (for increasing the scratch resistance) relative to 100 parts of binder may be contained in the mixtures.

The parts and percentages referred to in the Examples are parts by weight and percentages by weight unless otherwise indicated.

EXAMPLES

The polyurethane dispersions used in the examples were prepared in the following manner:

Dispersion (1)

In a reaction vessel, 100 parts of polytetrahydrofuran (molecular weight 2000), 4.47 parts of trimethylolpropane, 544 parts of an acrylated epoxide resin (1) (Epikote 828-diacrylate) and 225 parts of 4,4-diphenylmethane diisocyanate are dissolved in 873 parts of tetrahydrofuran.

After adding 0.2 parts of dibutyltin dilaurate and 0.2 parts dibutyltinoctoate, the mixture is stirred at 60° C. until the NCO content is zero percent.

Within a period of 5 minutes, a mixture of 92 parts of 80 percent mercaptoacetic acid, 80.8 parts of triethylamine, and 42 parts of acetone is added dropwise. After 1 hour at 60° C., enough water is added until a dispersion will result.

The solvent is removed under vacuum. The solids content of the dispersion is 32.6 percent.

Dispersion (2)

The dispersion is produced as described for Dispersion (1) but using 200 parts of polytetrahydrofuran and 237.5 parts of 4,4'-diphenylmethane diisocyanate. The solids content of the dispersion is 27.1 percent.

Dispersion (3)

In a reaction vessel, 200 parts of polytetrahydrofuran (molecular weight 2000), 8.94 parts of trimethylolpropane and 200 parts of 4,4'-diphenylmethane diisocyanate are dissolved in 689 parts of tetrahydrofuran. After adding 0.1 part of dibutyltin dilaurate and 0.2 part of dibutyltin octoate, the mixture is stirred at 60° C. for 15 minutes.

At that point, 808 parts of a 67 percent acetonic solution of Epikote 828 diacrylate are added.

The mixture is stirred at 60° C. until the NCO content is zero. Within a period of 5 minutes, a mixture of 92 parts of 80 percent mercaptoacetic acid, 80.8 parts of triethylamine, and 42 parts of acetone is added dropwise.

Subsequently, and after one hour, enough water is added to result in a dispersion.

The solvent is removed by vacuum distillation. The solids content of the dispersion is 40 percent.

The cross-linking agents (organic compounds which are diolefinically unsaturated and have a molecular weight between 130 and 2000) used in the examples were prepared in the following manner:

Acrylated Epoxide Resin (1)

The diglycidyl ether of Bisphenol A having an average molecular weight of 370 and an epoxide value of 0.51 to 0.54 was reacted according to the present state of the art (see for instance U.S. Pat. Nos. 2,890,202, 3,373,075, 3,420,514, 3,535,403 and German Published Application No. 1,618,729) with acrylic acid in a mole ratio of 1:2. The resultant reaction product is dissolved in acetone so that a 50 percent solution will be obtained.

Acrylated Polyester

A hydroxyl group containing polyester produced from one equivalent of adipic acid, 0.53 equivalent of phthalic anhydride, 1.81 equivalent ethylene glycol, and 0.78 equivalent trimethylolpropane is reacted with a molar excess of acrylic acid according to the present state of the art. After completed reaction, the solvent and unreacted acrylic acid are removed at 10 to 15 torr at increased temperature.

Acrylated Epoxide Resin (2)

The triglycidyl ether of pentaerythritol is reacted with acrylic acid in a mole ratio of 1:3 according to the latest state of the art (for instance, German Published Application No. 2,317,523). The reaction is complete with an acid number of less than 3.

Electroimmersion Coatings

EXAMPLE 1

In a reaction vessel, 184 parts of the polyurethane dispersion (1), 80 parts of a 50 percent solution of the acrylated epoxide resin (1) in acetone and 4 parts of benzildimethylketal were mixed by intensive stirring. Fully demineralized water is added until the solids content of the dispersion is 10 percent. The dispersion is aged at 40° C. for 12 hours in order to remove the organic solvent and is then cooled to room temperature. The pH value of the dispersion is 8.1 and the specific conductivity is 874 μs per centimeter.

With a deposition voltage of 200 volts, zinc phosphated steel sheets are coated anodically with a deposition time of 2 minutes. They are rinsed with fully dimineralized water, heated to 100° C. for 8 minutes, and after cooling, are passed by a high pressure mercury radiation source (current consumption 80 watts per centimeter of arc length) at a distance of 10 centimeters on a band with a speed of 6 meters per minute. The coating properties are listed in Table 1.

EXAMPLE 2

In a reaction vessel, 258 parts of polyurethane dispersion (2), 60 parts of acrylated epoxide resin (1) (50 percent) and 4 parts benzildimethylketal are processed into a 10 percent aqueous dispersion as described under Example 1. The pH value of this dispersion is 7.6 and the conductivity 920 μs per centimeter. With a deposition voltage of 250 volts, zinc phosphated sheets are coated anodically. After rinsing with fully demineralized water, these sheets are heated to 100° C. for one minute and the coating is cured with ultraviolet radiation as described in Example 1. The coating properties are described in Table 1.

EXAMPLE 3

A 10 percent electroimmersion coating contains 221 parts of the polyurethane dispersion (2), 80 parts of the acrylated epoxide resin (1) (50 percent), and 4 parts of the UV initiator. The pH value of the dispersion is 7.8, and the conductivity is 780 μs per centimeter. The metal sheets are coated and cured as described in Example 2.

EXAMPLE 4

A 10 percent electroimmersion paint contains 184.5 parts of the polyurethane dispersion (2), 100 parts of the acrylated epoxide resin (1) (50 percent), and 4 parts of the UV initiator. The pH value of the dispersion is 7.2, and the conductivity is 686 μs per centimeter. The metal sheets are coated as described in Example 2 but the deposition voltage is 200 V. The coatings are cured as described in Example 2 by means of UV radiation.

EXAMPLE 5

A 10 percent electroimmersion coating contains 369 parts of the polyurethane dispersion (2) and 4 parts of the UV initiator described in Example 1. The pH value of the bath is 7.5 and the conductivity 1560 μs per centimeter. With a deposition voltage of 150 volts, the metal sheets are coated anodically, subsequently heated to 100° C. for five minutes, and are then cured as described in Example 1.

EXAMPLE 6

A 10 percent electroimmersion coating contains 175 parts of the polyurethane dispersion (3), 60 parts of the acrylated epoxide resin (1) (50 percent) and 4 parts of the UV initiator from Example 1. Its pH value is 7.5 and the conductivity is 1217 μs per centimeter. The deposition voltage is 120 volts. The metal sheets are heated to 100° C. for 2 minutes and the coatings are cured as described in Example 1.

EXAMPLE 7

A 10 percent electroimmersion coating contains 184 parts of the polyurethane dispersion (1), 40 parts of the acrylated polyester (2) and 3 parts of benzildimethylketal. Its pH value is 7.5 and the conductivity is 1123 μs per centimeter. The deposition voltage is 150 volts. The coatings are cured as described in Example 2.

EXAMPLE 8

A 10 percent electroimmersion coating contains 240 parts of the polyurethane dispersion (2), 35 parts of the acrylated epoxide resin (3) and 2 parts of benzildimethylketal. Its pH value is 7.7 and the conductivity is 998 μs per centimeter. The deposition voltage is 120 volts. The coatings are cured as described in Example 2.

EXAMPLE 9

The electroimmersion coating of Example 7 is used but without the UV initiator. The coated metal sheets are heated to 100° C. for one minute and are then transported past an electron beam with an energy of 160 kilovolts and a dosage of 7.1 Mrad with a band velocity of 15 meters per minute. Table 2 describes the properties of the coating.

EXAMPLE 10

The electroimmersion paint of Example 8 is used but without the UV initiator. The coated metal sheets are heated to 100° C. for 2 minutes. Then the coatings are cured as described in Example 9.

EXAMPLE 11

The electroimmersion paint of Example 1 is used without the UV initiators. The coated metal sheets are heated to 100° C. for 5 minutes and the coatings are then cured with the electron beams as described.

EXAMPLE 12

In a reaction vessel, 231 parts of the polyurethane dispersion (2) and 124.4 parts of the acrylated epoxide resin (1) (50 percent) are mixed by vigorous stirring. Fully demineralized water is added along with 25 parts of titanium dioxide of the Rutil type which is dispersed by wet grinding. The electroimmersion paint has a solids content of 15 percent, a pH value of 8.3 and a conductivity of 750 μs per centimeter. Zinc phosphated sheet metals are coated with a deposition voltage of 150 volts. The coatings are then cured with electron radiation as described.

EXAMPLE 13

In a reaction vessel, 160 parts of the polyurethane dispersion (2) and 58 parts of the acrylated epoxide resin (1) are mixed by vigorous stirring. Fully demineralized salt and 28 parts of titanium oxide of the Rutil type are added with the titanium dioxide being dispersed by wet grinding. The electroimmersion paint has a solids content of 10 percent, a pH value of 8.4 and a conductivity of 630 μs per centimeter. Zinc phosphated metal sheets are coated with a deposition voltage of 90 volts. The coatings are then cured as described using electron radiation.

EXAMPLE 14

In a reaction vessel, 170 parts of the polyurethane dispersion (2) and 62 grams of the acrylated epoxide resin (1) (50 percent) are mixed by vigorous stirring. Fully demineralized water, 21 parts of titanium dioxide of the Rutil type, and 2 parts of carbon black are added. The pigments are dispersed by wet grinding. The electroimmersion coating has a solids content of 10 percent, a pH value of 8.1, and a conductivity of 811 μs per centimeter. Using a deposition voltage of 50 volts, zinc phosphated metal sheets are coated and are then cured with electron beams as described.

TABLE 1

| Coating Properties of the Ultraviolet Cured Electroimmersion Paints | | | | | | | | |
|---|---|---|---|---|---|---|---|---|
| Example No. | 1 | 2 | 3 | 4 | 5 | 6 | 7 | 8 |
| Layer Thickness [microns] | 23 | 24 | 29 | 39 | 12 | 25 | 28 | 29 |
| Pendulum Hardness [sec.] | 179 | 178 | 186 | 167 | 111 | 161 | 110 | 61 |
| Erichsen-Cupping [mm] | 9 | >10 | 7.2 | 6.0 | >10 | 9.2 | >10 | 8 |
| Gloss (60°) [%] | 99 | 100 | 100 | 100 | 100 | 100 | 94 | 25 |
| Corrosion Protection in Under-rusting [rust creep] after 240 hours in [mm] | 4 | 3 | 4 | 4 | 96h:10 | 18 | 10 | 96h:5 |
| Acetone Resistance | i0 | i0 | i0 | i0 | i0 | i0 | i0 | i0 |

TABLE 2

| Coating Properties of Films Cured with Electron Beams | | | | | | |
|---|---|---|---|---|---|---|
| Example No. | 9 | 10 | 11 | 12 | 13 | 14 |
| Layer Thickness [microns] | 30 | 26 | 20 | 55 | 20 | 28 |
| Pendulum Hardness [sec.] | 109 | 104 | 221 | 106 | 147 | 129 |
| Erichsen-Cupping [mm] | 9.8 | 8.5 | 7.8 | 7.0 | 8.0 | 5.3 |
| Gloss (60°) [%] | 92 | 45 | 100 | 85 | 77 | 23 |
| Corrosion Protection in Under-rusting [rust creep] after 240 hours in [mm] | 10 | 120h:9 | 5 | 8 | 12 | 120h:10 |
| Acetone Resistance | i0 | i0 | i0 | i0 | i0 | i0 |

The embodiments of the invention in which an exclusive privilege or property is claimed are defined as follows:

1. A process for coating electrically conductive objects comprising
   A. immersing said object as the anode of an electric current in an aqueous polyurethane dispersion prepared by
      (1) forming a polyurethane solution by reacting an organic polyisocyanate in the presence of an organic solvent with
         (a) an acrylic ester diol having a molecular weight of between 146 and 3,000;
         (b) an organic polyhydroxyl compound other than (a) having a molecular weight between 400 and 5,000 selected from the group consisting of polyester polyols, polyether polyols, polycarbonates, polylactones, and mixtures thereof; and
         (c) optionally a chain extender selected from the group consisting of diols, triols, diamines, aminoalcohols, having a molecular weight between 62 and 400, water, and mixtures thereof;
      (2) forming an anionic polyurethane addition product by reacting said polyurethane solution with a mercaptocarboxylic acid salt in the presence of a solvent;
      (3) adding water; and
      (4) removing the organic solvent, and
   B. passing an electric current between the anode and a cathode which is also dispersed in said dispersion, and
   C. irradiating said object with ultraviolet radiation or electron rays.

2. The process of claim 1 wherein the ratio of isocyanate groups to reactive hydrogen atoms in forming the polyurethane solution is 0.4:1 to 1.3:1.

3. The process according to claims 1 and 2 wherein the aqueous dispersion contains 5 to 20 percent by weight of anionic polyurethane addition product.

4. The process according to claim 3 wherein 50 percent by weight of the anionic polyurethane addition product is replaced by at least diolefinically unsaturated organic compounds having a molecular weight between 130 and 2000.

5. The process of claim 4 wherein the reaction product of diglycidyl ether and Bisphenol A with acrylic acid in a mole ratio of 1:2 is used as the at least doubly olefinically unsaturated organic compound having a molecular weight between 130 and 2000.

6. The process of claim 1 wherein the polyurethane solution is reacted with such quantities of the mercaptocarboxylic acid salts that the content of carboxylate groups of the anionic polyurethane addition product is 3 to 15 percent by weight.

7. The process of claim 1 wherein the ratio of isocyanate groups to reactive hydrogens in the polyurethane solution is 0.5:1 and 1:2:1.

8. The process of claim 1 wherein the anionic polyurethane addition product to be used contains 0.3 to 3 moles of acrylic ester carbon to carbon double bonds per 1000 grams of anionic polyurethane addition product.

9. The process of claim 1 wherein the anionic polyurethane addition product contains a water-insoluble photoinitiator for ultraviolet rays in a quantity of 1 to 4 percent by weight relative to the anionic polyurethane addition product.

10. A coated object prepared in accordance with the process of claim 1.

11. The coated object of claim 10 wherein the object coated is a metal selected from the group consisting of iron, steel, and aluminum.

* * * * *